United States Patent
Matsueda

(10) Patent No.: US 7,602,512 B2
(45) Date of Patent: *Oct. 13, 2009

(54) METHOD AND APPARATUS FOR AUTHENTICATION IN SECURE PRINTING

(75) Inventor: Kazutaka Matsueda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 926 days.

This patent is subject to a terminal disclaimer.

(21) Appl. No.: 10/389,980

(22) Filed: Mar. 18, 2003

(65) Prior Publication Data

US 2003/0179404 A1 Sep. 25, 2003

(30) Foreign Application Priority Data

Mar. 22, 2002 (JP) .............................. 2002-080771

(51) Int. Cl.
 *G06F 15/00* (2006.01)
(52) U.S. Cl. ...................... 358/1.15; 711/100; 711/147; 711/150; 711/157; 710/1; 710/15; 709/217; 358/1.18; 358/1.14; 358/1.13; 358/1.16
(58) Field of Classification Search .................. 358/1.1, 358/1.13, 1.15, 1.16, 1.18, 1.6, 296, 400, 358/402, 500, 1.14; 379/100.08; 395/114; 399/79, 80; 709/203, 217, 219; 710/1, 8.1, 710/15, 17; 711/100, 147, 150, 157; 713/155

See application file for complete search history.

(56) References Cited

U.S. PATENT DOCUMENTS

| | | | |
|---|---|---|---|
| 5,287,194 A * | 2/1994 | Lobiondo | 358/296 |
| 5,673,373 A * | 9/1997 | Nosaki et al. | 358/1.15 |
| 6,378,070 B1 * | 4/2002 | Chan et al. | 713/155 |
| 6,513,073 B1 * | 1/2003 | Kawai et al. | 710/1 |
| 6,771,386 B1 * | 8/2004 | Kato | 358/1.15 |
| 6,975,421 B1 * | 12/2005 | Hashimoto et al. | 358/1.16 |
| 7,079,269 B2 * | 7/2006 | Teeuwen et al. | 358/1.15 |
| 7,256,907 B2 * | 8/2007 | Matsueda | 358/1.15 |
| 2003/0133152 A1 * | 7/2003 | Matsueda | 358/1.15 |

FOREIGN PATENT DOCUMENTS

| | | |
|---|---|---|
| JP | 11-039119 | 2/1999 |
| JP | 11-112754 | 4/1999 |
| JP | 2000-235642 | 8/2000 |
| JP | 2001-075752 | 3/2001 |
| JP | 2001-86284 | 3/2001 |

* cited by examiner

*Primary Examiner*—Ashish K Thomas
(74) *Attorney, Agent, or Firm*—Fitzpatrick, Cella, Harper & Scinto

(57) ABSTRACT

Secrecy of printed matter is raised and charges for a storing area are more accurately charged. According to the invention, a printing apparatus is instructed so as to store print data corresponding to a print request into one of a plurality of storing areas. The print data is transmitted to the printing apparatus. The user is notified of authentication information corresponding to the print data stored in one of the plurality of storing areas.

15 Claims, 15 Drawing Sheets

FIG. 14

Mr. ⟨DATA 1⟩

ESTIMATE

| GOODS | AMOUNT OF MONEY | |
|---|---|---|
| ⟨DATA 2⟩ | ⟨DATA 3⟩ | YEN |
| ⟨DATA 4⟩ | ⟨DATA 5⟩ | YEN |
| TOTAL | ⟨DATA 6⟩ | YEN |

ABC Co., Ltd.

FIG. 15

```
⟨DATA 1⟩  XYZ INC
⟨DATA 2⟩  XXX
⟨DATA 3⟩  1000
⟨DATA 4⟩  YYY
⟨DATA 5⟩  2000
⟨DATA 6⟩  "⟨DATA 3⟩+⟨DATA 5⟩"
```

METHOD AND APPARATUS FOR AUTHENTICATION IN SECURE PRINTING

BACKGROUND OF THE INVENTION

1. Field of the Invention

The invention relates to a print system comprising: a client apparatus such as a personal assistant or the like; a server apparatus which receives a print request from the client apparatus and makes a printing apparatus to print; and the printing apparatus which receives the print request from the client apparatus and prints.

2. Related Background Art

In a conventional print system, when there is a print request from a client apparatus, print data is collected once to a server apparatus and sequentially transmitted from the server apparatus to a printing apparatus.

In another case, after the print data is transmitted from the client apparatus to the server apparatus, a request for extracting the print data is made to the server apparatus by an information terminal such as a personal computer or the like near the printing apparatus.

The conventional print system, consequently, has the following problems.

First, since the print data is transmitted from the server apparatus to the printer and printed as soon as the print request is made, printed matter can be taken away or read by others and there is no secrecy.

According to a method whereby the print data is stored in the server apparatus and the extracting request is made, although it is excellent in the secrecy, since the print data is transmitted to the printer after the extracting request is made, it takes a time to print.

To solve such a drawback, there is a method whereby the print data is not stored into the server apparatus but into a memory box peculiar to the printer. However, since the memory box has been fixedly formed in the printer and a password or the like for extraction has also been fixed, there is a fear that the password is known to the third party and it is not good in the security.

Usually, the memory box is not presented to the outside but is a special area which can be used only by limited persons. Therefore, there is not a mechanism to notify the client apparatus of a situation of the memory box.

SUMMARY OF THE INVENTION

It is, therefore, an object of the invention to enable the user to execute printing of printed matter in good secrecy.

As compared with the method such that the user approaches the printer and downloads the print data from the server apparatus to the printer in order to raise the secrecy, the print time is reduced.

The server apparatus inputs a print job to the memory box, sets a password into the memory box, and monitors a use time of the memory box, so that use of the memory box is unitarily managed via the server apparatus, thereby enabling charging management based on charges for the memory box to be easily and accurately made.

The server apparatus responds to a print situation sent from the client apparatus, thereby enabling the user to recognize a present situation of a printing process responsive to the print request.

Since the user can browse the situation of the printing process via a Web browser, dedicated application software is unnecessary and an inexpensive system can be constructed, thereby simplifying a system construction.

Even in the case of printed matter which needs the stricter secrecy like a slip, the user can obtain it without its contents seen by other users.

BRIEF DESCRIPTION OF THE DRAWINGS

FIG. 14 is a diagram showing an example of slip form data;

FIG. 15 is a diagram showing an example of variable data; and

DETAILED DESCRIPTION OF THE PREFERRED EMBODIMENT

The invention will be described in detail hereinbelow with respect to an embodiment.

Figure 1:
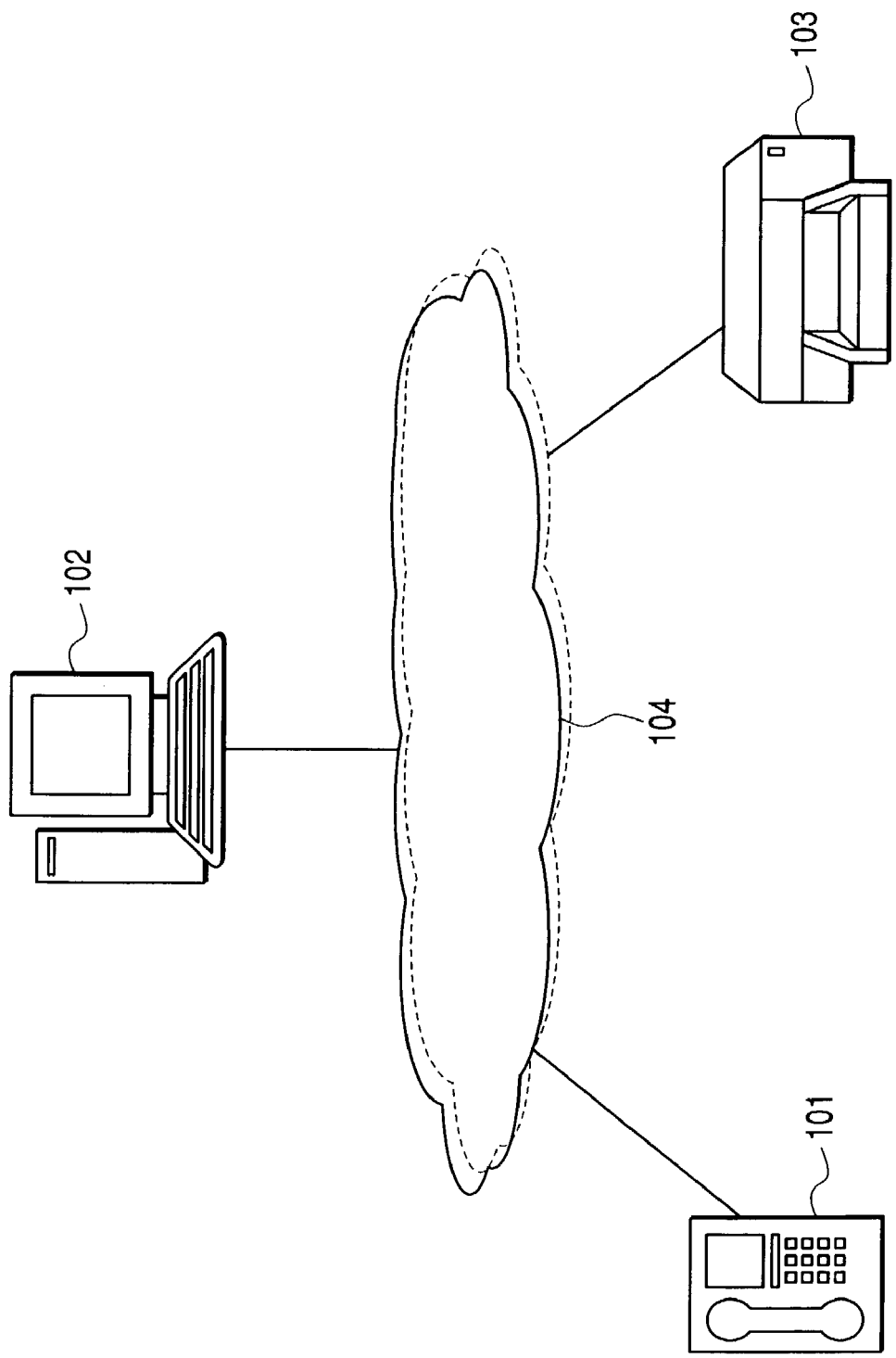
FIG. 1 is a schematic diagram of a print system.

FIG. 1 is a schematic diagram of a print system. In FIG. 1, reference numeral 101 denotes a client apparatus which is used by the user in order to instruct printing. The client apparatus 101 is an information processing apparatus such as personal computer, cellular phone, personal assistant, or the like and an arbitrary apparatus can be used so long as it can make a print request including print data. Reference numeral 102 denotes a server apparatus. The server apparatus 102 receives the print requests from a plurality of client apparatuses and sequentially supplies the print data to a printing apparatus (printer) 103. The apparatuses 101, 102, and 103 are connected by a network 104 such as Internet, LAN, wireless LAN, telephone line, digital line, or the like. According to the invention, the client apparatuses 101 transmit the print requests to the server apparatus 102 and the server apparatus 102 arbitrates processing order of the print requests.

Figure 2:
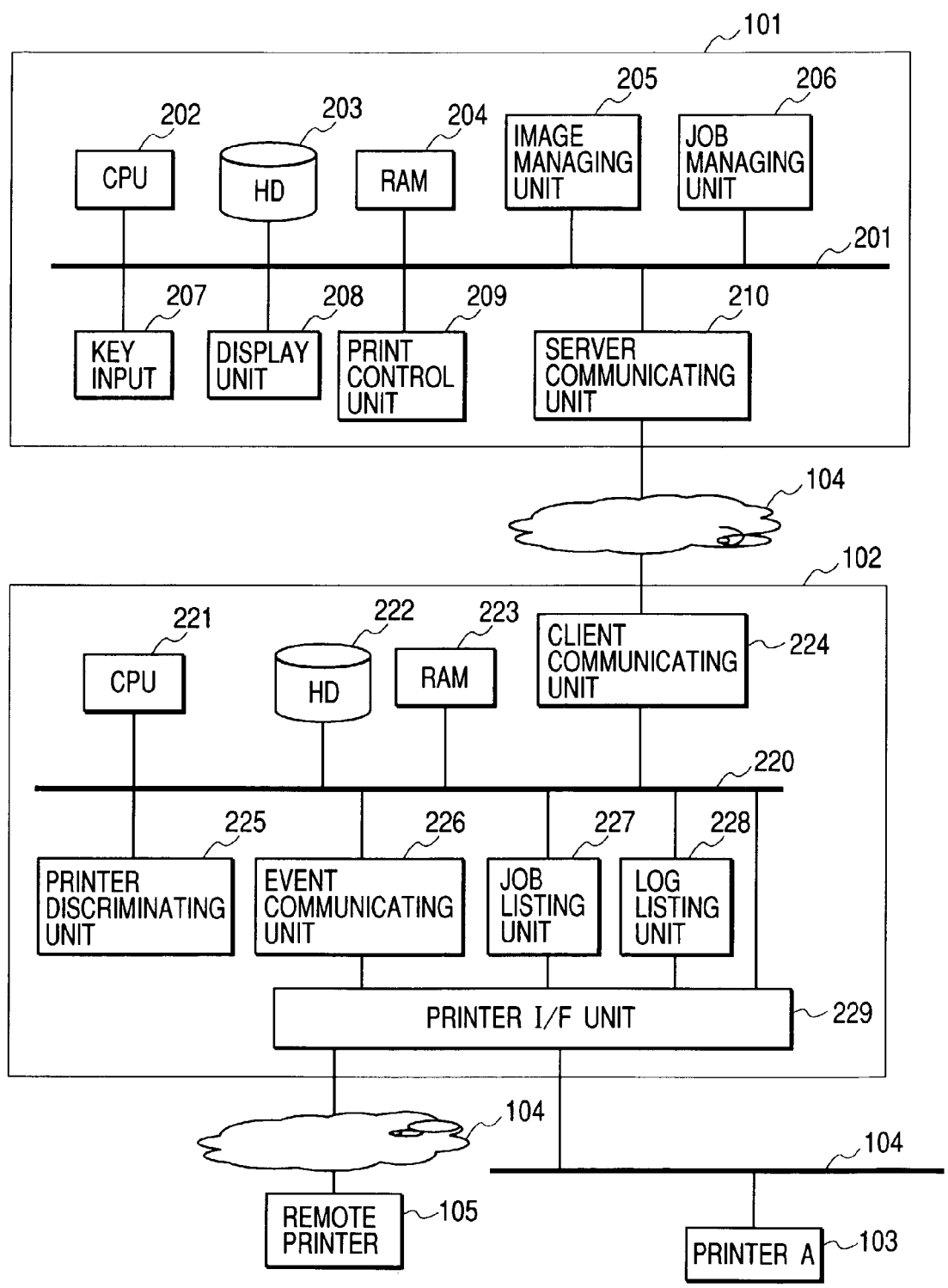
FIG. 2 is a block diagram of the print system.

FIG. 2 is a block diagram of the print system. In the embodiment, the print system comprises the client apparatus 101, server apparatus 102, and network printer 103. The client apparatus 101, server apparatus 102, and network printer 103 are connected by the network 104.

The client apparatus comprises the following component elements. Reference numeral 201 denotes a system bus of the client apparatus; 202 a CPU for controlling the system; 203 a hard disk (HD) in which codes of a control program which is executed in the CPU 202 have been written; 204 a RAM; and 205 an image managing unit. The image managing unit 205 manages image data inputted by a user application program. Reference numeral 206 denotes a job managing unit for managing information regarding a print job based on the print data; 207 a key input unit such as keyboard, mouse, or the like of the personal computer or the like; 208 a display unit such as a display or the like; 209 a print control unit for controlling transfer of the print data by using a protocol for printing such as IPP, LPR, or the like; and 210 a server communicating unit for communicating with the server apparatus 102. The server communicating unit 210 controls the communication by using a protocol such as HTTP (Hyper Text Transfer Protocol) or the like and executes the communication with the server apparatus 102.

When the print job is inputted by the user application program in the same machine or of an external personal computer, image data is stored into the image managing unit 205 and the information (job information) regarding the print job is managed in a queue such as an FIFO or the like in the job managing unit 206.

The server apparatus comprises the following component elements. Reference numeral 220 denotes a system bus of the server apparatus 102; 221 a CPU for controlling the system of the server apparatus 102; 222 a hard disk (HD) in which codes of a control program which is executed in the CPU 221 have been written; 223 a RAM; 224 a client communicating unit for communicating with the client apparatus; 225 a printer discriminating unit for discriminating whether the print job inputted by the client apparatus 101 to the printer 103 has normally been processed by the printer and printed matter has been ejected or not; 226 an event communicating unit which receives an event notification from the printer; 227 a job listing unit for obtaining a list of the print jobs in the printer and managing them; 228 a log listing unit for referring to a history (log) of a print result which is held in the printer; and 229 a printer I/F unit for setting and analyzing a protocol which has been predetermined between the printer and the client apparatus.

Reference numeral 103 denotes the printer and 105 indicates a remote printer connected by a Web interface. When the print request is received from the user application program, the image data is held in the image managing unit 205, the job information is held in the job managing unit 206, and thereafter, the print request is transmitted to the server apparatus 102. The server apparatus 102 which manages the printer receives the print requests from a plurality of client apparatuses and makes the printer to form a memory box. When the memory box is successfully formed, the server apparatus 102 transmits information such as box number, password, and the like which are necessary for extraction to the client apparatus which transmitted the print request, and inputs the print job including the print data and the job information to the memory box of the printer immediately after the printer becomes available. The user stores the box number, password, and the like notified from the server apparatus and inputs them by operating an operation panel of the printer, so that he can extract printed matter.

Figure 3:
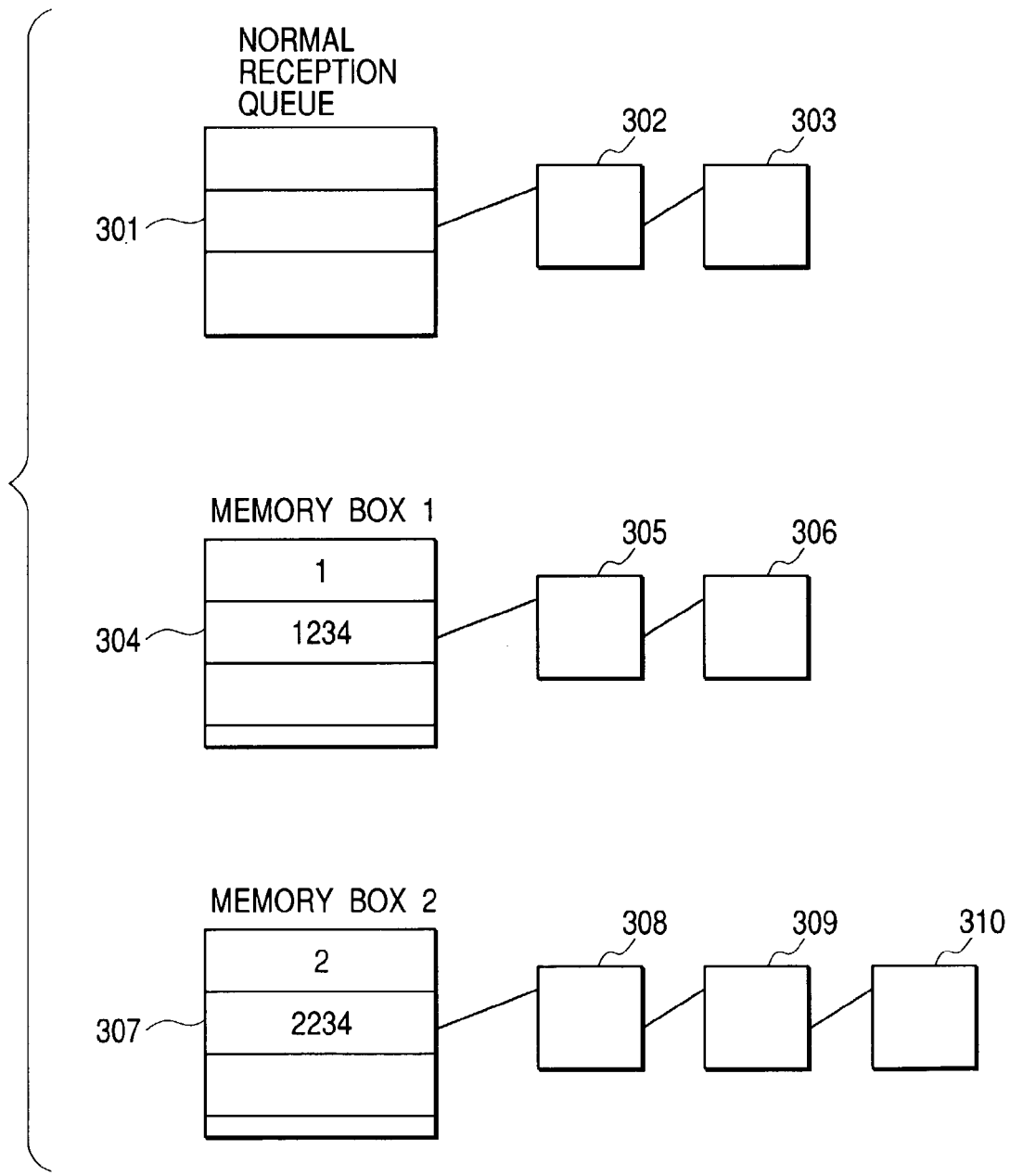
FIG. 3 is a constructional diagram of a reception queue and memory boxes in a printer.

FIG. 3 is a constructional diagram of a reception queue and memory boxes in the printer. Explanation will be made in detail hereinbelow with reference to FIG. 3. Reference numeral 301 denotes a normal reception queue. A print job in which there is no designation of the memory box and a print output is immediately executed is stored into this queue. In FIG. 3, two print jobs 302 and 303 are connected.

Reference numeral 304 denotes a memory box 1 and 307 indicates a memory box 2. In the memory box 1, a box number is equal to "1" and a password is equal to "1234". The box number and the password can be registered into the memory box when the box is formed. The box number can be fixedly allocated to the memory box and only the password can be formed after the box was formed.

In FIG. 3, print jobs 305 and 306 are connected to the memory box 1 and managed. In the memory box 2, a box number is equal to "2" and a password is equal to "2234". Similarly, print jobs 308, 309, and 310 are connected and managed.

Figure 4:
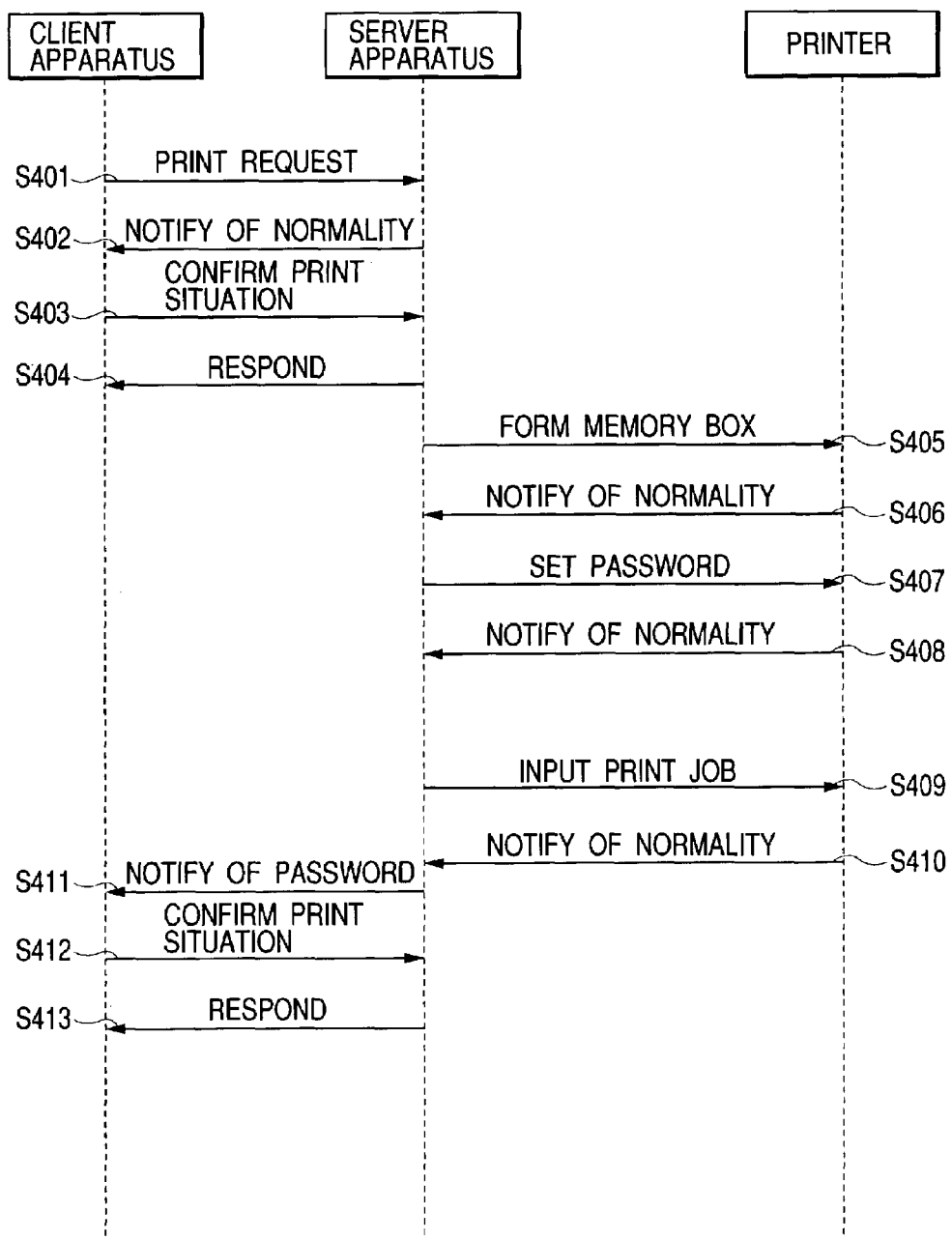
FIG. 4 is a control flow in a normal state in the print system.

FIG. 4 is a control flow in the print system in a normal state. Explanation will be made in detail hereinbelow with reference to FIG. 4. FIG. 4 shows the control flow which is executed by the client apparatus 101, server apparatus 102, and network printer 103. First, in step S401, the client apparatus issues a print request to the server apparatus. In the print request, a name of the printer to print (any information can be used so long as it can identify the printer), the print job including the print data and the job information, a name of the client apparatus, and the like are transmitted. After the server apparatus 102 received the print request, it connects the print job to the print queue in the server.

In step S402, the server apparatus notifies the client of the fact that the reception of the print request has normally been finished. After step S402, although the line between the client apparatus 101 and the server apparatus 102 is usually disconnected, it can be continuously connected in accordance with the system.

In step S403, the client apparatus 101 confirms a situation of the print request to the server apparatus 102. In step S404, the server apparatus 102 transmits a proper response to the confirmation of the print situation. At this time, the server apparatus confirms the present location of the print job according to the print request and transmits a proper response.

In step S405, the server apparatus 102 executes the process for forming the memory box to the printer 103. When the memory box is successfully formed, in step S406, the printer 103 notifies the server apparatus 102 that the box has normally been formed. At the same time, the server apparatus 102 is notified of the box number.

In step S407, the server apparatus 102 executes the process for setting the password into the memory box formed in step S405. A value such as "2345" is transmitted to the printer 103 and set into the formed memory box. The user can allow the print data in the memory box to be printed by using the password and extract a document.

When the setting of the password is normally finished, the printer 103 notifies the server apparatus 102 of it. Subsequently, in step S409, the server apparatus 102 executes the process for inputting the print job including the print data into the printer 103. When the print job is inputted to the printer and normally stored into the memory box, in step S410, the printer 103 notifies the server apparatus 102 of it.

In step S411, the server apparatus 102 notifies the client apparatus 101 of the password, box number, installing location of the printer, and the like. Thus, the user can be secretly informed of the box number and the password.

In step S412, the client apparatus 101 newly confirms the server apparatus 102 about the situation of the print request. Since the print job has already been transmitted to the printer, in step S412, the server apparatus 102 notifies the client apparatus 101 that "the print data has been transmitted to the printer" or "the print data has already been printed".

After that, when the user inputs the password and the box number from the operation panel of the printer, the printer executes an authenticating process on the basis of the inputted password. That is, whether the inputted password coincides with the password set in the memory box indicated by the inputted box number or not is discriminated. As a result of the authenticating process, if it is determined that the inputted password is correct, the print data is read out from the memory box indicated by the inputted box number and the printing based on the print data is executed. After completion of the printing, the print data is deleted from the memory box.

Figure 5:
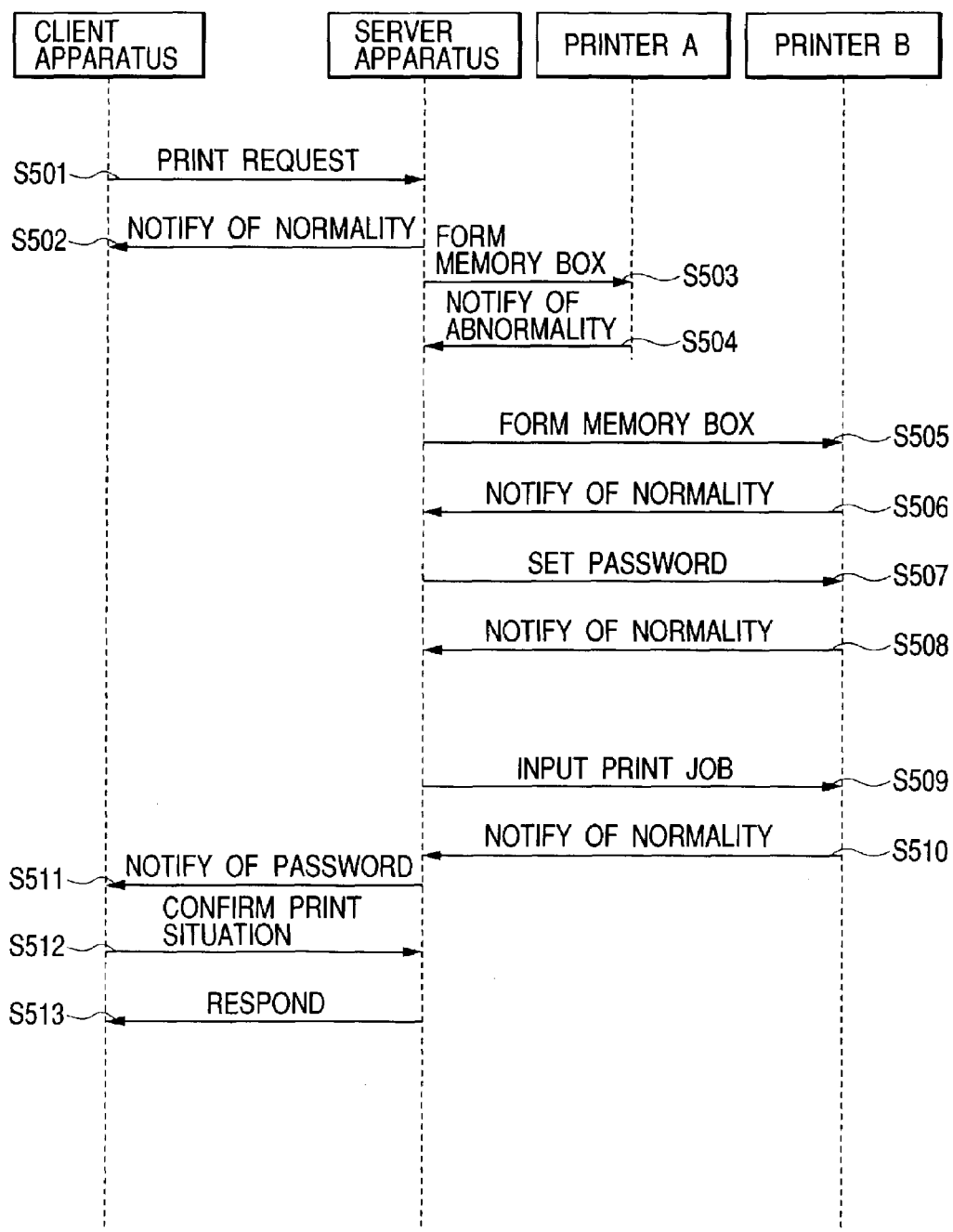
FIG. 5 is a control flow upon switching of the printer.

FIG. 5 is a control flow upon switching of the printer. Explanation will be made hereinbelow in detail with reference to FIG. 5. FIG. 5 shows the control flow which is executed by the client apparatus 101, server apparatus 102, and printers 103 and 105. First, in step S501, the client apparatus issues a print request to the server apparatus. In the print request, at this time, a printer A is designated. In step S502, the server apparatus notifies the client that the reception of the print request has normally been finished.

In step S503, the server apparatus 102 executes the process for forming a memory box to the printer A. It is now assumed that the creation of the memory box failed. As an example of the failure, a case where there is no residual memory box and all memory boxes have already been used is considered.

In step S504, therefore, the printer A notifies the server apparatus 102 that the box is not formed. Therefore, after the creation of the box to the printer A failed, the server apparatus 102 selects the optimum printer with reference to a printer management table (not shown) in the server. It is now assumed that a printer B was selected. Thus, in step S505, the server apparatus 102 executes the forming process of the memory box to the printer B. When the box is successfully formed, in step S506, the printer B notifies the server apparatus 102 that the box has normally been formed. At the same time, the server apparatus 102 is notified of the box number.

In step S507, the server apparatus 102 executes the process for setting the password into the memory box formed in step S505. A value such as "2345" is transmitted to the printer B and set into the formed memory box. The user can allow the print data in the memory box to be printed by using the password and extract a document.

When the setting of the password is normally finished, the printer B notifies the server apparatus 102 of it. Subsequently, in step S509, the server apparatus 102 executes the process for inputting the print job including the print data into the printer B. When the print job is inputted to the printer and normally stored into the memory box, in step S510, the printer B notifies the server apparatus 102 of it.

In step S511, the server apparatus 102 notifies the client apparatus 101 of the password, box number, installing location of the printer B, and the like. Thus, the user can be secretly informed of the box number and the password.

In step S512, the client apparatus 101 newly confirms the server apparatus 102 about the situation of the print request. Since the print job has already been transmitted to the printer, in step S512, the server apparatus 102 notifies the client apparatus 101 that "the print data has been transmitted to the printer" or "the print data has already been printed".

Thus, even if the memory box is not normally formed, since the memory box is automatically formed in another printer, the user does not need to make the print request again. If the memory box is formed in another printer, the user is notified of it via the client apparatus. Therefore, the user is not confused about into which printer he should enter the password.

Figure 6:
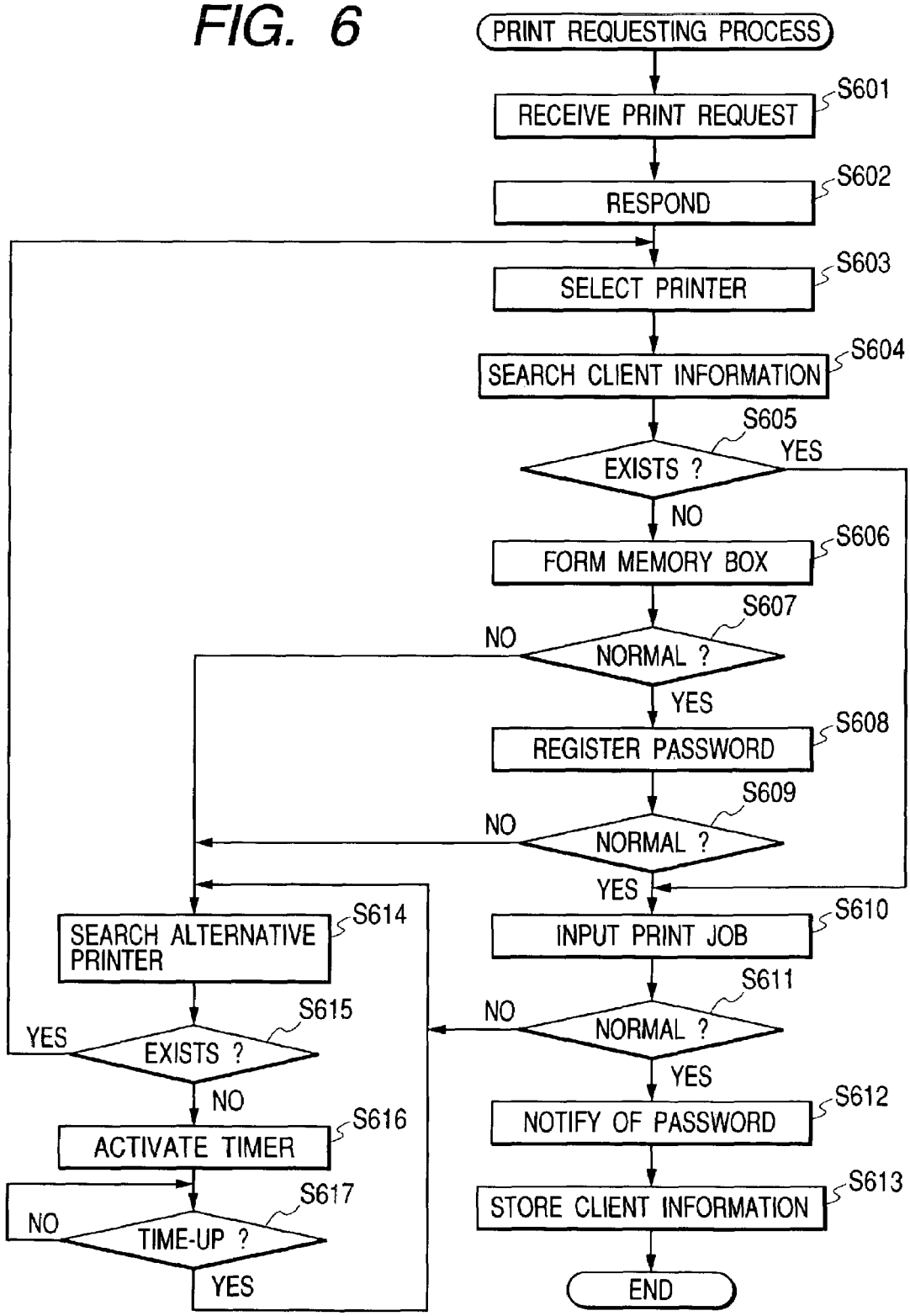
FIG. 6 is a flowchart showing processes which are executed in the case where a server apparatus receives a print request from a client apparatus.

FIG. 6 is a flowchart showing processes which are executed in the case where the server apparatus receives the print request from the client apparatus. Explanation will be made hereinbelow in detail with reference to FIG. 6. The server apparatus executes the processes shown in FIG. 6, so that the processes shown in FIG. 4 or 5 are executed.

First, in step S601, the print request is received from the client apparatus and information such as host name and network address indicative of the client apparatus which issued the print request is held. Information showing the time when the print request is received is also held. In step S602, a response to the print request is made. This process corresponds to step S402 or S502.

Subsequently, in step S603, the printer instructed from the client apparatus is selected. A name of the printer is not instructed from the client apparatus but can be managed by the server apparatus every kind of service for printing. It can be automatically selected in accordance with a name, an address, or the like of the client apparatus.

Subsequently, in step S604, whether the client apparatus which issued the print request is a client apparatus in which the print job is held in the memory box of the printer or not is confirmed by searching the client information. This is because the print job of the client apparatus has already been inputted to the memory box and still stored therein, the print job which is sent from the client apparatus is subsequently inputted to this memory box.

If the job of the client apparatus has already been inputted to the memory box, step S610 follows. In step S610, the print job from the client apparatus is inputted to the memory box.

If it is determined that there is no job of the client apparatus, step S606 follows. In steps S606 to S609, a process to newly hold a memory box for storing the job from the client apparatus is executed.

First, in step S606, a process to form the memory box into the printer selected in step S603 is executed. At this time, the server apparatus transmits, for example, a command to hold the memory box to the printer.

In step S607, whether the memory box has normally been formed or not is discriminated. If the memory box is not normally formed, step S614 follows. If the memory box has normally been formed, step S608 follows. In step S608, the password is set into the formed memory box. In this instance, for example, a command to set the password is transmitted to the printer.

In step S609, whether the password has normally been set or not is discriminated. If the password has normally been set, step S610 follows. If it is not normally set, step S614 follows. If the notification as shown in step S408 is transmitted from the printer, it is possible to determine that the password has normally been set. If it has normally been set, the print job is inputted to the printer in step S610. At this time, the print job is inputted to the memory box formed in step S606 or the memory box indicated by the box number stored in the client information.

In step S611, whether the print job has normally been inputted or not is discriminated. If the print job is not normally inputted because the memory in the printer is busy or the like, step S614 follows. If the print job has normally been inputted, step S612 follows.

In step S612, the client apparatus is notified of the printer name, box number, password, and the like. Further, in step S613, as information regarding the client apparatus, information showing that the print job from the client apparatus has been inputted to the memory box and the box number of the memory box in which the print job has been inputted are stored.

In step S614, an alternative printer is searched in order to prepare for the case where the memory box is not normally formed (NO in step S607), where the password is not normally registered (NO in step S609), or where the print job is not normally inputted (NO in step S611).

In step S615, whether the alternative printer can be searched or not is discriminated. If there is an alternative printer, step S603 follows and the creation of the memory box or the like is executed to the detected printer. If the alternative printer is not searched, a timer is activated in step S616 in order to search the printer again after the elapse of a predetermined time. If the timer times up after the elapse of the predetermined time, step S614 follows.

If the memory box is formed in the printer and the print job is successfully inputted to the printer by the above processes, the client apparatus can be notified of the password or the like. The user can obtain the password. If the print job is not inputted to the printer, another printer is searched and a memory box can be formed there.

Figure 7:
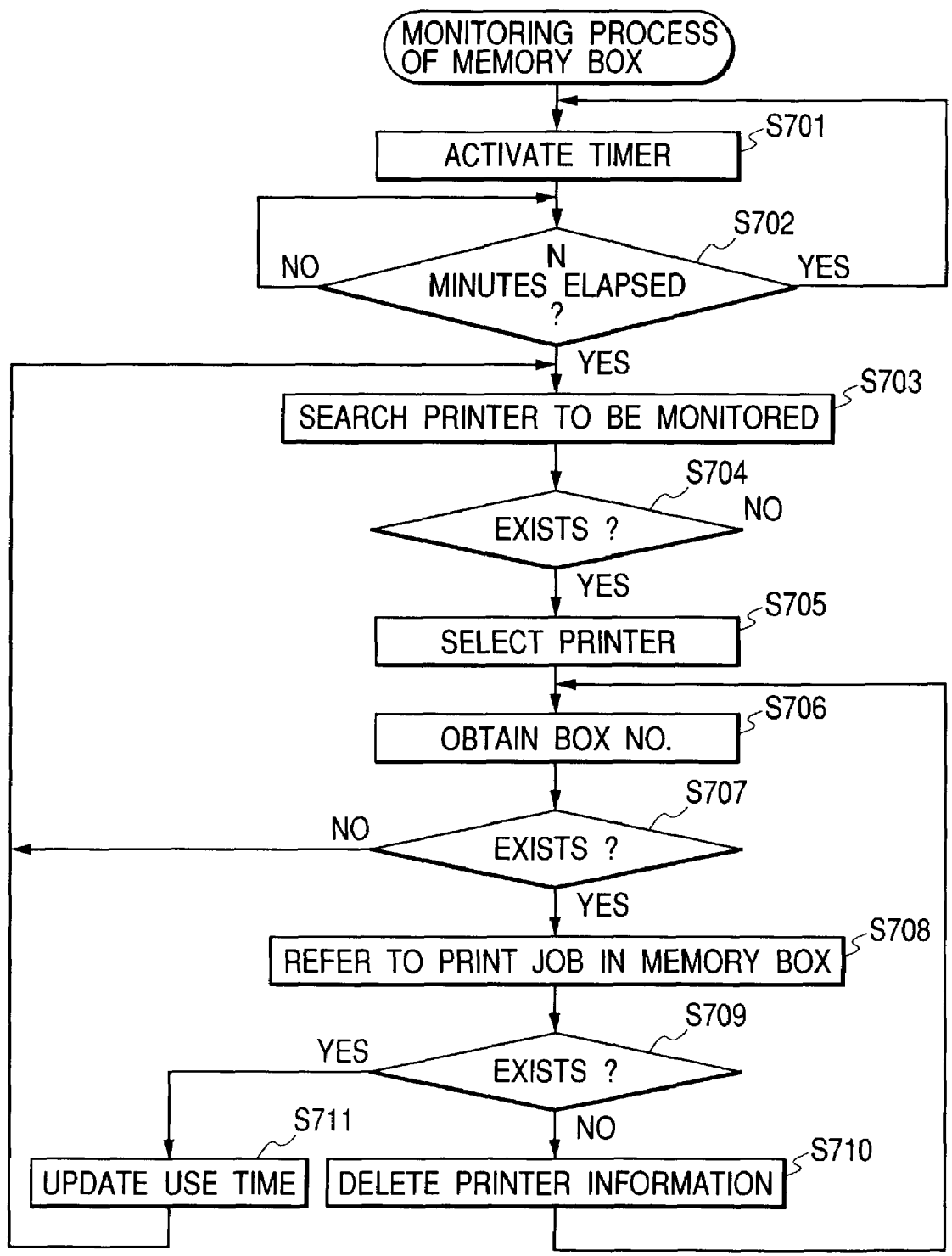
FIG. 7 is a flowchart showing processes which are executed in the case where a server apparatus 102 monitors the memory box.

FIG. 7 is a flowchart showing processes which are executed in the case where the server apparatus 102 monitors the memory box. Explanation will be made hereinbelow in detail with reference to FIG. 7. The server apparatus 102 activates the timer in step S701 in order to monitor the printer at a predetermined period.

Subsequently, whether a designated time (N minutes) has elapsed or not is discriminated. If YES, step S703 follows. It is assumed that a value of N can be set by the server apparatus 102.

Figure 8:
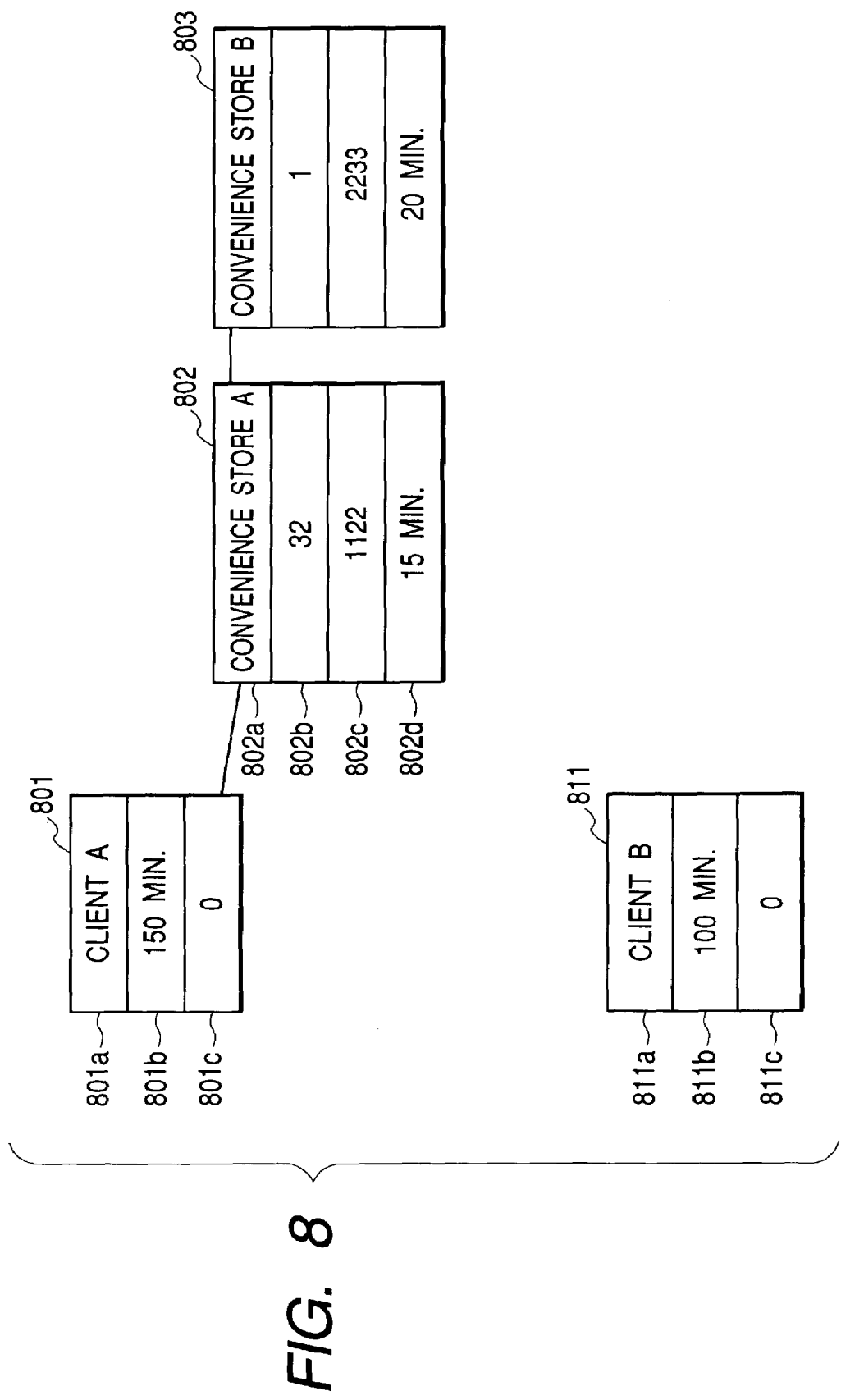
FIG. 8 shows tables for charging management stored in the server apparatus 102.

In step S703, the printer to be monitored is searched. Upon searching the printer, a data structure as shown in FIG. 8 is used. FIG. 8 shows tables for charging management stored in the server apparatus 102. Explanation will be made hereinbelow in detail with reference to FIG. 8.

Reference numeral 801 denotes client information of a client apparatus A. In the client information 801, reference numeral 801a denotes a name of the client apparatus or a name of the user and 801b indicates a total use time of the memory box. The total use time 801b shows a time during which the memory box is occupied and its value increases if the print job is stored and held in the memory boxes of the printers. In the case of using the memory boxes of a plurality of printers, a total of the use time of each printer is obtained. At a point when use of the memory box is finished, its use time is added to the total use time 801b. In the embodiment, the use time (150 minutes) is shown.

The total use time 801b is cleared to 0 when the charges are settled and indicates the use time until the present time after the settlement. An amount of money which should be paid by the user is calculated on the basis of the value of the total use time 801b and a charging unit (not shown). For example, if the memory box rents at a rate of 10 yen per minute, the money amount until the present time is equal to 1500 yen (150 minutes×10 yen).

Reference numeral 801c denotes a head of a queue to manage the printer information regarding the printer which is being used by the client apparatus A. Specifically speaking, printer information 802 and printer information 803 are connected.

In the printer information 802, reference numeral 802a denotes a name of the printer and 802b indicates a number of the box which is being used. At present, the box No. "32" is used. Reference numeral 802c denotes a password allocated to the box. At present, "1122" is set. Reference numeral 802d denotes a use time of this box. It shows that at the present time point, the print data is not extracted for 15 minutes but stored and held.

Although the charging method based on the use time has been shown and described in the embodiment, the charging can be made on the basis of a memory occupation amount of the printed matter. In this case, it is sufficient to store the total number of print jobs and the total data size of the print data into 801c and 802d. A method of using both of the memory occupation amount and the box use time can be easily realized.

As a result of the search for the printer in step S703, the presence or absence of the printer information which is not selected yet is discriminated in step S704. If the printer information which is not selected yet exists, step S705 follows. In step S705, one of the printer information which is not selected yet is selected. If the printer information which is not selected yet does not exist or there is no printer to be monitored as in the case of 811 in FIG. 8, the processing routine is returned to step S701.

Subsequently, in step S706, the box number is read out from the printer information. In step S707, the presence or absence of the box number is discriminated. If the box number cannot be read out, step S703 follows. If the box number has been stored, step S708 follows. If the memory box is not used, since this means that no information is set in 802b and 802c, the processing routine advances to step S703.

In step S708, the printer shown by the printer information selected in step S705 is directly inquired, thereby discriminating whether the print job exists in the memory box shown by the box number obtained in step S706 or not. In this case, the server apparatus 102 transmits a communication command which requires the information regarding the memory box to the printer, thereby inquiring.

In step S709, whether the print job exists in the memory box or not is discriminated. If it is determined that the print job exists in the memory box, step S711 follows. In step S711, the use time stored in the printer information is updated. For example, a value of N minutes is added.

If it is determined in step S709 that the print job does not exist in the memory box, the printer information is deleted in step S710. For example, in a state as shown in FIG. 8, the printer "convenience store A" is inquired about the information regarding the memory box of the box No. "32", so that if the print job does not exist, the printer information 802 is deleted from the queue. Thus, a mechanism which can efficiently use the memory resources of the server apparatus 102 is obtained. By combining the box management and the charging management, a charging management system can be easily constructed.

Figure 9:
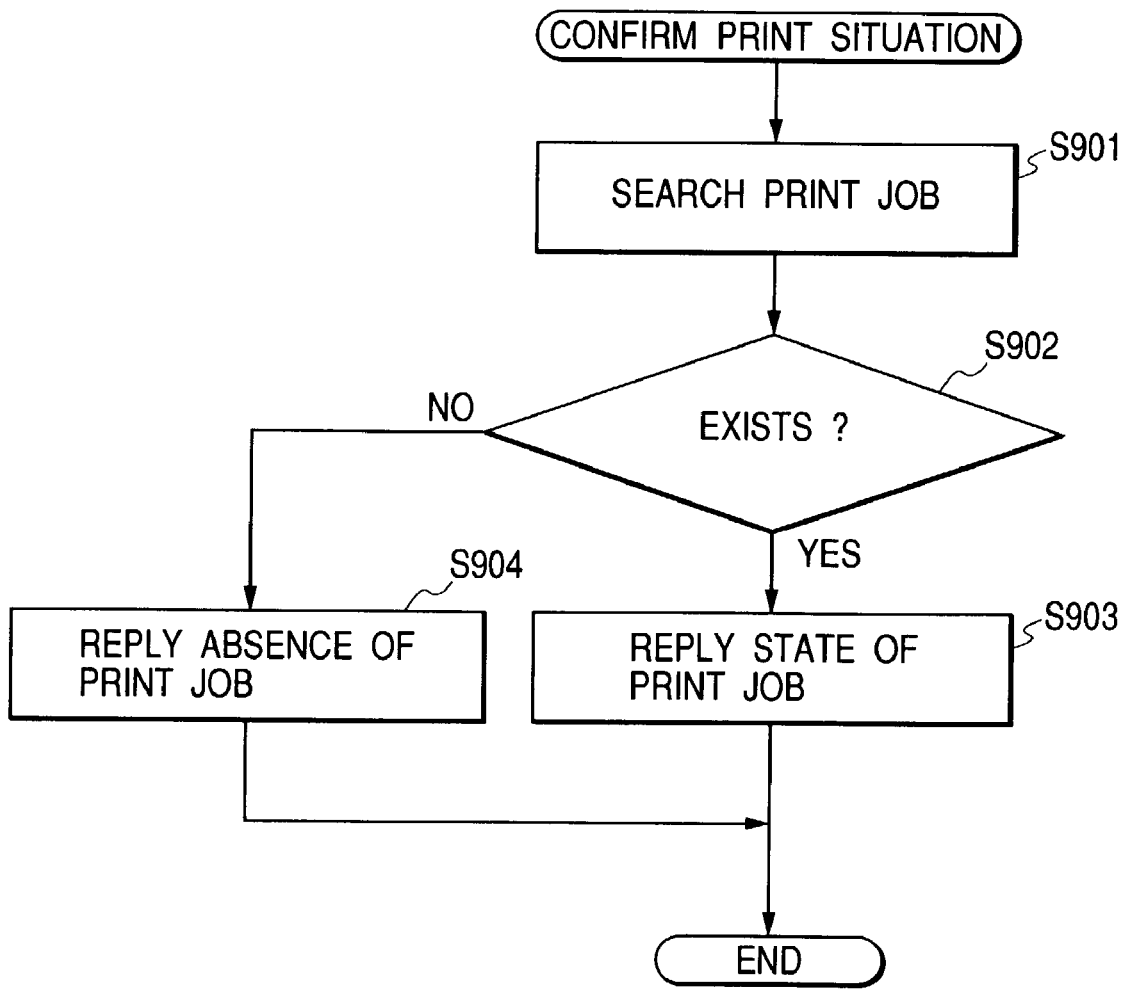
FIG. 9 is a flowchart showing processes which are executed in the case where the server apparatus 102 receives a print situation confirmation from the client apparatus.

FIG. 9 is a flowchart showing processes which are executed in the case where the server apparatus 102 receives a print situation confirmation from the client apparatus. Explanation will be made hereinbelow with reference to FIG. 9.

In step S901, the print job to be confirmed by the print situation confirmation is searched. As a result of the search, the presence or absence of the corresponding print job is discriminated. In the search, whether the print job exists in the server apparatus 102 or not is discriminated. Further, if it does not exist in the server apparatus 102, the memory box, the reception queue, and the like in each printer are confirmed.

If it is determined that the corresponding print job exists in either the memory box or the reception queue, step S903 follows. In step S903, a state of the existing print job is returned. This means that a response in which the place where the print data exists, such as memory box and reception queue in the printer, print queue in the server apparatus, or the like and a progressing situation such as "the print data is being formed", "the print data has already been formed", or the like are combined is made.

As a result of the discrimination in step S902, if it is determined that the print job does not exist in either the memory box or the reception queue, step S904 follows and a reply "the print data does not exist" is made.

Figure 10:
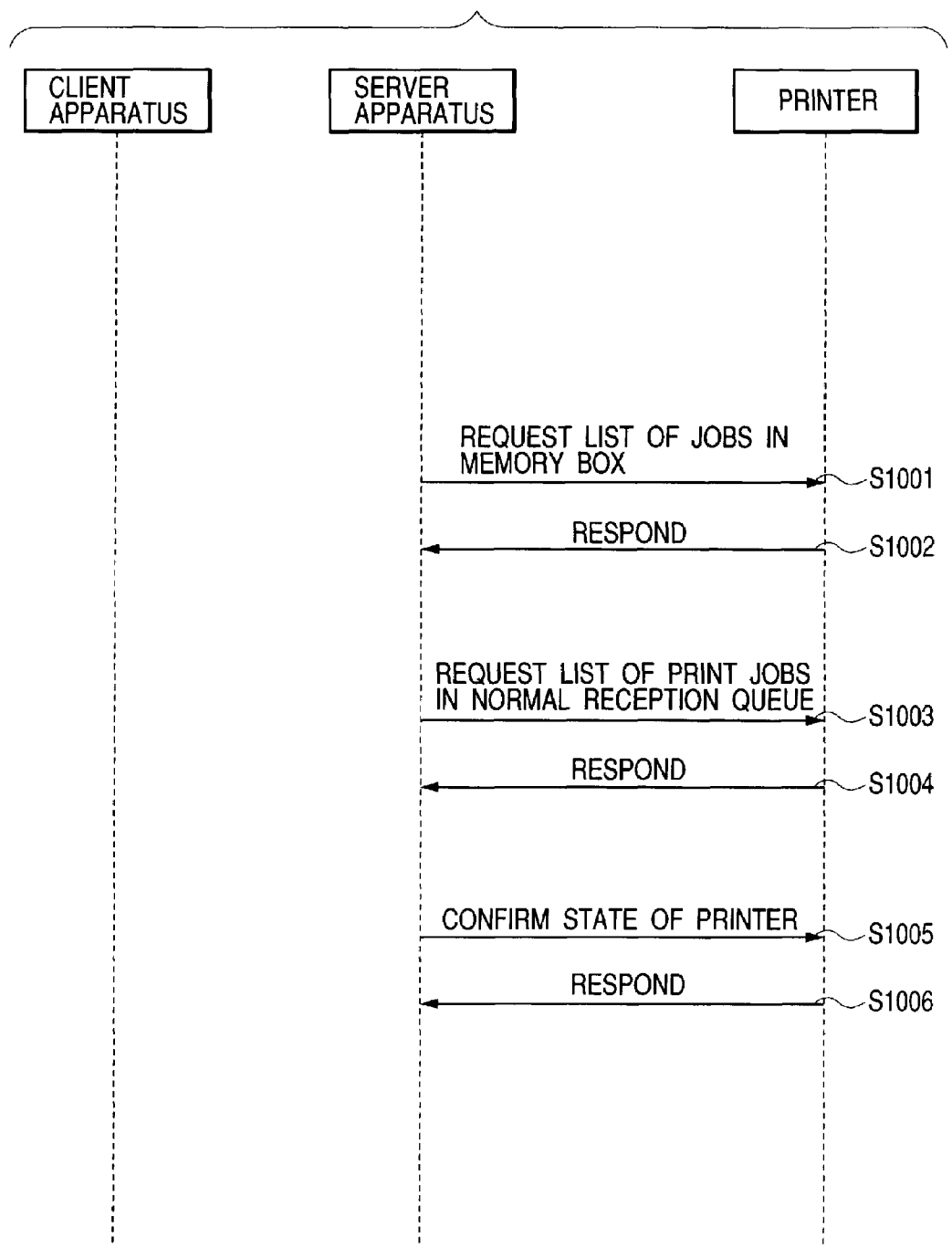
FIG. 10 is a flowchart showing processes which are executed in the case where the server apparatus 102 monitors the printer at every predetermined period.

FIG. 10 is a flowchart showing processes which are executed in the case where the server apparatus 102 monitors the printer at every predetermined period. Explanation will be made hereinbelow with reference to FIG. 10.

First, in step S1001, the server apparatus requests the list of the print jobs in the memory box from the printer in order to discriminate the presence or absence of the print job in the memory box. In step S1002, the printer responds a result of the request.

Subsequently, the server apparatus 102 requests the list of the print jobs registered in the normal reception queue in order to discriminate the presence or absence of the print job connected to the normal reception queue of the printer. In step S1003, if the connected print job exists, the printer responds all of the job information.

In step S1005, the server apparatus 102 checks the state of the printer. In step S1006, the printer returns information showing that there is no paper or it is normal as a response.

By listing up the print jobs in the memory box, the server apparatus 102 can update as shown in FIG. 7. By listing up the print jobs in the normal reception queue, the search of the print jobs in step S901 can be made easy and they are used to return the location information of the print jobs and the state of the printer. The confirmation of the state of the printer is used to search the alternative printer in step S614. By repeating processes in steps S1001 to S1006 at every predetermined period, the construction is simplified and there is no need to make surplus monitoring.

Figure 11:
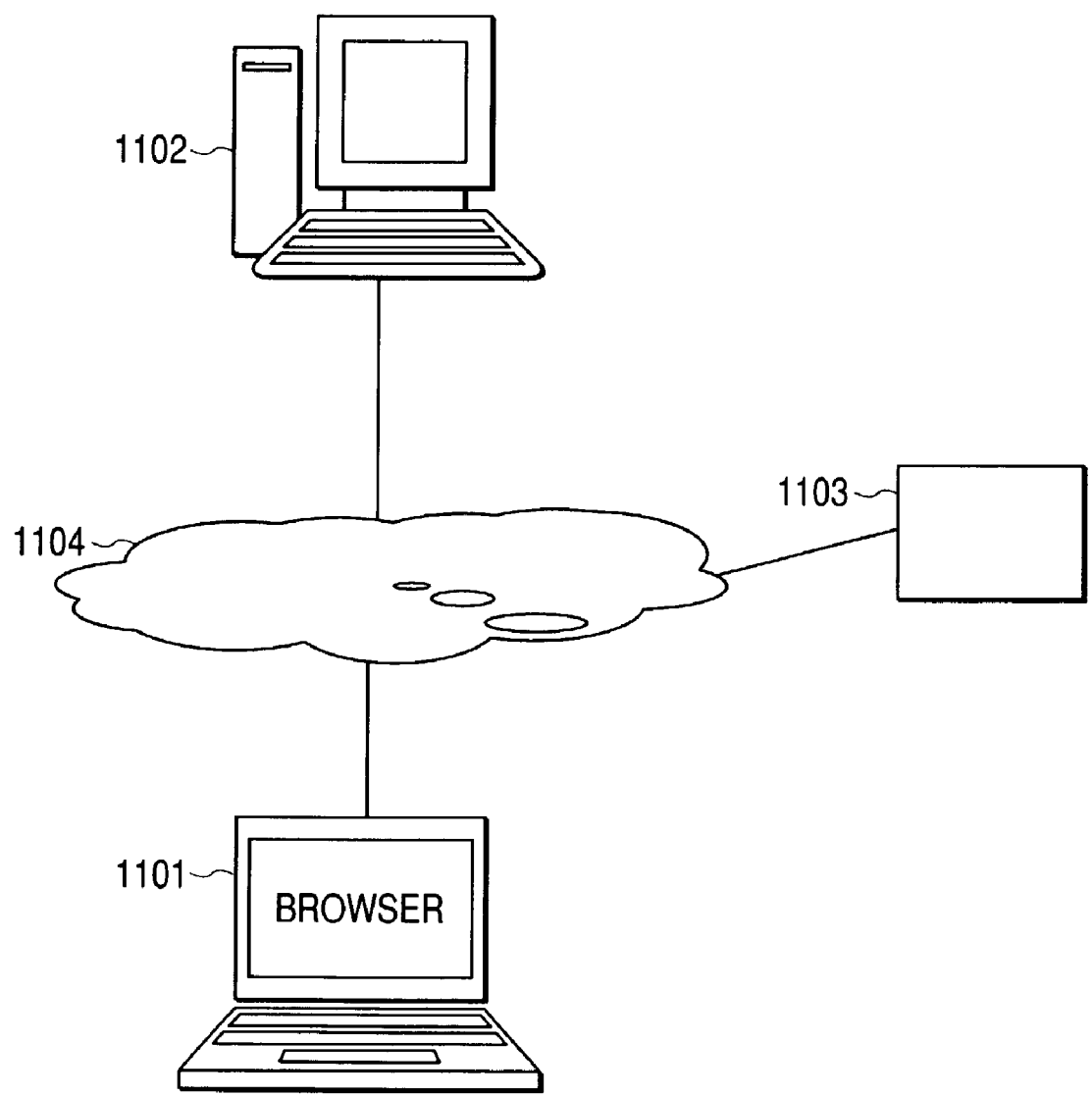
FIG. 11 is a schematic diagram of a slip print system.

The foregoing system can be assembled into the following system. FIG. 11 is a schematic diagram of a slip print system. Explanation will be made hereinbelow with reference to FIG. 11. Reference numeral 1102 denotes a server apparatus in the slip print system; 1104 an Internet serving as a communication line; and 1103 a printer.

Reference numeral 1101 denotes a client apparatus in the slip print system. The client apparatus 1101 can browse the state of the printer and the state of the print job by a Web browser. By using the standard browser as mentioned above, there is an advantage such that the system can be constructed at low costs even if any special application software for displaying or the like is not used.

Figure 12:
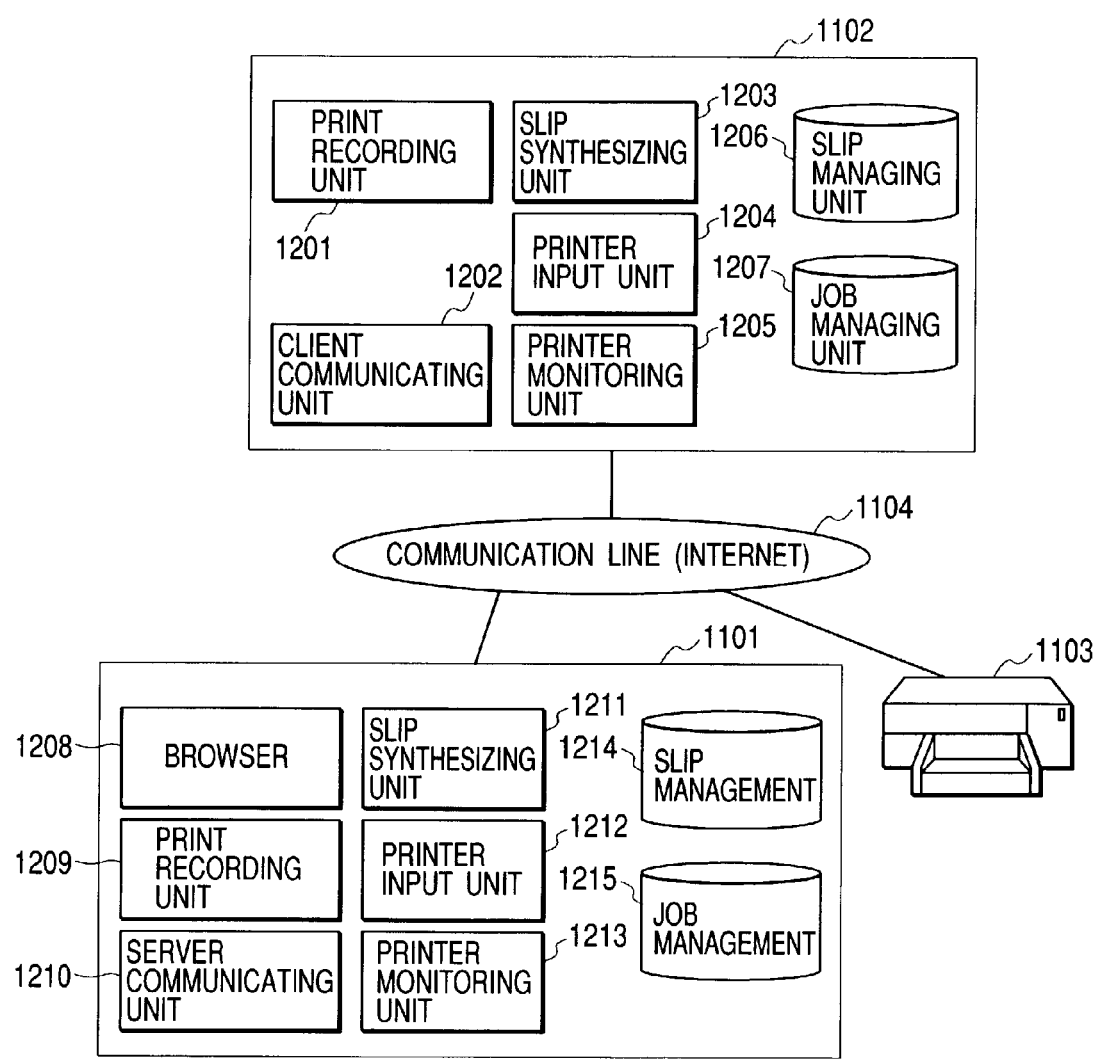
FIG. 12 is a constructional diagram of a client apparatus and a server apparatus in the slip print system.

FIG. 12 is a constructional diagram of the client apparatus and the server apparatus in the slip print system. Explanation will be made in detail hereinbelow with reference to FIG. 12. In FIG. 12, reference numerals 1201 to 1207 denote a function construction of the server apparatus 1102. Reference numeral 1201 denotes a print recording unit in which a print log has been recorded; 1202 a communicating unit for communicating with the client; and 1203 a slip synthesizing unit for superposing slip form data and variable data. The variable data is data which is embedded into the slip form data and it is a value which changes in accordance with contents of a slip.

Reference numeral 1204 denotes a printer input unit for outputting the print data to the printer via the communication line; 1205 a printer monitoring unit for monitoring the printer; 1206 a slip managing unit of a database for managing the slip form data which has previously been formed; and 1207 a job managing unit for managing the information of the print job including the print data of the slip which was synthesized and formed.

Reference numerals 1208 to 1215 denote a function construction of the client apparatus 1101. Reference numeral 1208 denotes a browser for displaying the printer information, job information, and the like on the server apparatus 1102. This browser interprets data described mainly by an HTML (Hyper Text Markup Language) and displays various information so that they can be browsed.

Reference numeral 1209 denotes a print recording unit in which a print log based on the print request from the client apparatus has been recorded; 1210 a server communicating unit for communicating with the server apparatus; 1211 a slip synthesizing unit for superposing slip form data and variable data; 1212 a printer input unit for outputting the print data to the printer via the communication line; 1213 a printer monitoring unit for monitoring the printer; 1214 a database in which the slip form data which has previously been formed has been managed; and 1215 a job managing unit for managing the information of the print job including the print data of the slip which was synthesized and formed.

In recent years, a slip forming tool separately has the slip form data in a predetermined format and the variable data to be superposed thereto. When the print request is made, both of them are superposed, thereby forming the print data. The synthesization of the slip can be executed in any of the client apparatus, server apparatus, and printer and the slip is constructed so that the system can be easily used.

In the case where the slip synthesizing unit of the client apparatus 1101 forms the print data, the user instructs the printing via the browser 1208 and, thereafter, the client apparatus receives the variable data from the server apparatus and synthesizes it to the slip form data. At this time, when the browser 1208 makes the print situation confirmation to the server apparatus 1102, the server apparatus 1102 returns a status "the print data exists in the client apparatus".

In this case, when the client apparatus 1101 transmits the print job including the print data of the slip to the server apparatus 1102, the server apparatus 1102 executes the processes in FIG. 6.

When the slip synthesizing unit of the server apparatus 1102 forms the print data, if the print instruction is made by the browser 1208, the slip synthesizing unit 1203 synthesizes the variable data from the client apparatus and the slip form data managed in the slip managing unit 1206. In this instance, when the print situation confirmation is made to the server apparatus 1102 by the client 1101, the server apparatus 1102 returns the information "the print data exists in the server apparatus" and a status showing that "the print data has already been formed" or "waiting for the creation of the print data".

In this case, when the slip synthesizing unit 1203 forms the print data, the server apparatus 1102 executes processes in step S603 and subsequent steps in FIG. 6. That is, in place of receiving the print request including the print data from the client apparatus 1101, the server apparatus 1102 forms the print data in response to the print instruction and inputs it to the memory box of the printer.

Figure 13:
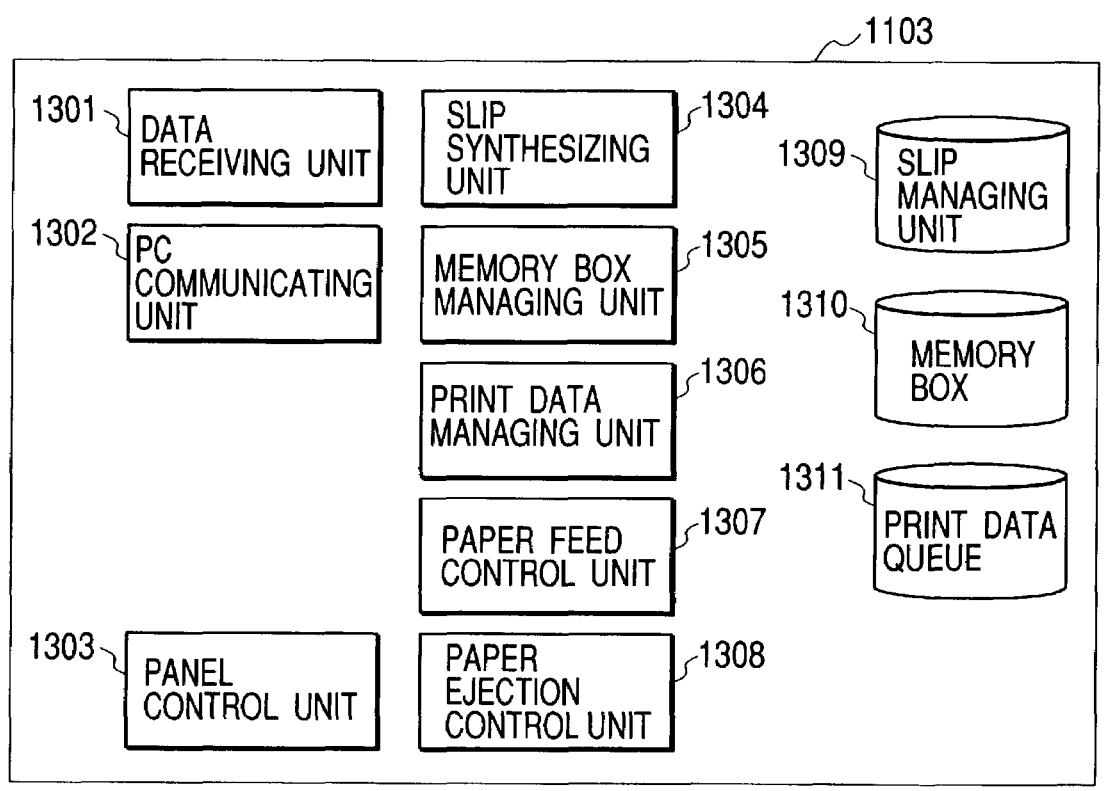
FIG. 13 is a function constructional diagram of a printer in the slip print system.

FIG. 13 is a function constructional diagram of the printer in the slip print system. Explanation will be made hereinbelow in detail with reference to FIG. 13. Reference numeral 1301 denotes a data receiving unit for receiving data from the client apparatus or the server apparatus. The data receiving unit 1301 receives the data by a protocol such as IPP (Internet Printing Protocol), LPR, or the like. Reference numeral 1302 denotes a PC communicating unit for receiving a requesting message of status confirmation from the client apparatus or the server apparatus.

Reference numeral 1303 denotes a panel control unit for controlling a key operation or the like of the printer; 1304 a slip synthesizing unit for superposing the slip form data and the variable data; 1305 a memory box data managing unit for managing information regarding the memory box; 1306 a print data managing unit for managing information regarding the print data which is obtained as a result of the synthesization; 1307 a paper feed control unit for feeding recording paper from a specific paper feeding stage; and 1308 a paper ejection control unit for controlling paper ejection of the printed recording paper.

Reference numeral 1309 denotes a slip managing unit for managing the slip form data which is synthesized by the slip synthesizing unit 1304; 1310 a memory box which is managed by the memory box data managing unit 1305; and 1311 a print data queue for managing the print data which is obtained as a result of the synthesization of the slip synthesizing unit 1304. The print data which is stored in the print data queue is sequentially print-processed.

When the slip synthesizing unit of the printer forms the print data, the slip form data is previously inputted to the slip managing unit 1309 prior to printing and the slip is managed. The user makes a print instruction via the browser 1208 and the variable data is inputted to the data receiving unit 1301 via the printer input unit 1204 of the server apparatus 1102. In the printer 1103 which received the variable data, the slip synthesizing unit 1304 synthesizes the received variable data and the slip form data stored in the slip managing unit 1309, forms the print data, and inputs the formed print data to the designated memory box. When a box extracting password is inputted from the operation panel, the print data is transferred from the memory box 1310 to the print data queue 1311 and sequentially print-processed.

In this case, the print job is not inputted to the printer but the variable data is inputted to the printer and the print data is stored into the memory box.

During such a period of time, the server apparatus 1102 executes the processes in FIG. 10 and can grasp the states of the memory box and the print data. In the printer situation confirmation, in addition to a printer status such as "no paper" or the like, the server apparatus can notify the client apparatus 1101 of a status such as "waiting for synthesization of the slip" or the like, thereby enabling the status of the printer to be easily understood. If the information was obtained in accordance with the processes in FIG. 10, the server apparatus 1102 manages the information by using the HTML or the like, thereby enabling it to be referred to by the browser of the client apparatus.

When the print situation confirmation is made to the server by the browser of the paper ejection control unit 1308, the server can see a result of the protocol of FIG. 10 and return a status "the print data exists in the printer". The server can also return information about whether "the slip has already been synthesized" in the printer or not as additional information.

FIG. 14 is a diagram showing an example of the slip form data. This is image data showing the slip, and by embedding values shown by the variable data into areas where <data n (n=1, 2, 3, 4, 5, 6)> has been described, and the print data is formed. By defining, the sum of the values of data 3 and data 5 can be embedded into <data 6>.

FIG. 15 is a diagram showing an example of the variable data. A value has been set into each of <data n (n=1, 2, 3, 4, 5, 6)>. In place of directly setting the values, the values can be defined by expressions.

Figure 16:
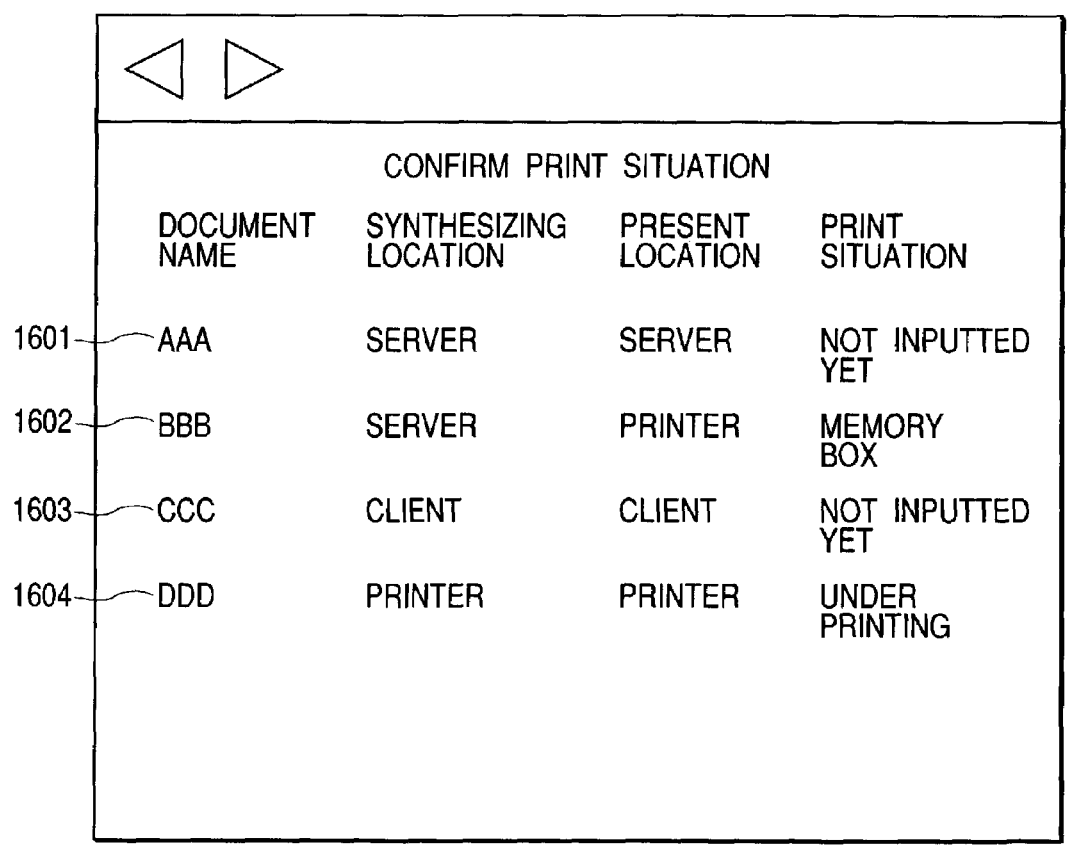
FIG. 16 is a diagram showing a display example of a print situation.

FIG. 16 is a diagram showing a display example of a print situation in the browser. Explanation will be made hereinbelow with reference to FIG. 16. Reference numeral 1601 denotes a state where print data "AAA" has been synthesized and formed by the server apparatus, is still managed in the server apparatus, and is not inputted to the printer.

Reference numeral 1602 denotes a state where print data "BBB" has been formed by the server apparatus, is managed in the printer at present, and has been stored in the memory box of the printer.

Reference numeral 1603 denotes a state where print data "CCC" has been formed by the client apparatus, is still managed in the client apparatus, and is not inputted to the printer.

Reference numeral 1604 denotes a state where print data "DDD" has been formed by the printer, is still managed in the printer, and is being printed.

As mentioned above, by displaying the synthesizing location of the slip, the position of the print job, the print situation, and the like, the user can more easily recognize the present situation.

Program codes for realizing the invention and related data are stored in a floppy disk (FD) or a CD-ROM and supplied therefrom to a computer.

The object of the invention is accomplished by a method whereby a memory medium in which program codes (for example, program codes showing each processing step in FIGS. 4, 5, 6, 7, 9, and 10) of software (control program) for realizing the functions of the embodiment as mentioned above have been recorded is supplied to a computer and a CPU (for example, CPU 202 or CPU 221) of the computer reads out and executes the program codes stored in the memory medium. As a method of supplying the program and data to the computer, a method whereby they are stored into the floppy disk FD and supplied to the computer main body (via the floppy disk drive) is general. In this case, the program codes themselves read out from the memory medium realize the functions of the embodiment as mentioned above and the memory medium in which the program codes have been stored and the program codes themselves construct the invention.

As a memory medium for supplying the program codes, for example, besides the floppy disk or the hard disk, an optical disk, a magnetooptic disk, a CD-ROM, a CD-R, a magnetic tape, a non-volatile memory card, a ROM, or the like can be used. Naturally, the invention incorporates not only a case where the computer executes the read-out program codes, so that the functions of the embodiment as mentioned above are realized but also a case where an OS (Operating System) or the like which is operating on the computer executes a part or all of actual processes on the basis of instructions of the program codes and the functions of the embodiment as mentioned above are realized by those processes. Further, naturally, the invention also incorporates a case where the program codes read out from the memory medium are written into a memory provided for a function expanding board inserted into a computer or a function expanding unit connected to a computer, thereafter, a CPU or the like provided for the function expanding board or the function expanding unit executes a part or all of actual processes on the basis of instructions of the program codes, and the functions of the embodiment as mentioned above are realized by those processes.

As described above, according to the invention, printing of the printed matter of the good secrecy for the user can be executed.

As compared with the method such that the user approaches the printer and downloads the print data from the server apparatus to the printer in order to raise the secrecy, the print time is reduced.

The server apparatus inputs the print job to the memory box, sets the password into the memory box, and monitors the use time of the memory box, so that use of the memory box is unitarily managed via the server apparatus, thereby enabling the charging management based on charges for the memory box to be easily and accurately made.

The server apparatus responds to the print situation from the client apparatus, thereby enabling the user to recognize the present situation of the printing process responsive to the print request.

Since the user can browse the situation of the printing process via the Web browser, the dedicated application software is unnecessary and the inexpensive system can be constructed, thereby simplifying a system construction.

Even in the case of the printed matter which needs better secrecy like a slip, the user can obtain the slip without its contents seen by other users.

What is claimed is:

1. A slip print system comprising a server apparatus, a client apparatus and a printing apparatus,
    wherein the server apparatus comprises:
        a command transmission unit, adapted to transmit a command to the printing apparatus in response to reception of a print request from the client apparatus, the command being provided to generate a memory box for storing synthesized data created by synthesizing slip form data with variable data, wherein said command transmission unit transmits the command before the synthesized data is transmitted to the printing apparatus;
        a setting unit, adapted to set authentication information for the memory box generated based on the command transmitted by said command transmission unit;
        an information transmission unit, adapted to transmit identification information for identifying the generated memory box and the authentication information set by said setting unit to the client apparatus;
        a search unit, adapted to search, in response to reception of another print request from the client apparatus, the printing apparatus for a memory box for the client apparatus that issued the other print request; and
        a synthesized data transmission unit, adapted to transmit the synthesized data to the generated memory box in the printing apparatus,
    wherein, if said search unit finds the memory box, said command transmission unit does not transmit the command in response to reception of the other print request and said synthesized data transmission unit transmits the synthesized data to the memory box found by said search unit, and if said search unit does not find the memory box, said command transmission unit transmits the command in response to reception of the other print request, and
    wherein the printing apparatus comprises:
        a storing unit, adapted to store the synthesized data transmitted by said synthesized data transmission unit in the generated memory box, wherein, if said search unit finds the memory box, said storing unit stores the synthesized data in the found memory box; and
        a print unit, adapted to obtain the synthesized data from the memory box and print the obtained synthesized data, if input authentication information is authenticated based on the authentication information set by said setting unit for the memory box,
        wherein the memory box is a memory area in which a plurality of job information can be registered, and the job information registered in the memory area is extracted and printed in response to an instruction different from the print request.

2. A system according to claim 1, wherein the printing apparatus further comprises a deletion unit, adapted to delete the synthesized data from the memory box if the synthesized data has been printed by said print unit.

3. A system according to claim 1, wherein the server apparatus further comprises a management unit, adapted to monitor the synthesized data stored in the memory box and manage a time during which the synthesized data is stored in the memory box.

4. A system according to claim 3, wherein a charging process is executed according to the time during which the synthesized data is stored in the memory box.

5. A system according to claim 1, wherein the server apparatus further comprises a notification unit, adapted to notify the client apparatus of a status of the print request in response to a request from the client apparatus.

6. A system according to claim 1, further comprising a second printing apparatus,
    wherein said command transmission unit transmits the command to the second printing apparatus, if the memory box cannot be assured in the printing apparatus designated by the client apparatus, and
    wherein the second printing apparatus stores the synthesized data in a memory box generated based on the command transmitted by said command transmission unit, and obtains the synthesized data from the memory box and prints the synthesized data, if input authentication information is authenticated based on the authentication information set by said setting unit for the memory box.

7. A server apparatus comprising:
    a command transmission unit, adapted to transmit a command to a printing apparatus in response to reception of a print request from a client apparatus, the command being provided to generate a memory box for storing synthesized data created by synthesizing slip form data with variable data, wherein said command transmission unit transmits the command before the synthesized data is transmitted to the printing apparatus;
    a setting unit, adapted to set authentication information for the memory box generated based on the command transmitted by said command transmission unit;
    an information transmission unit, adapted to transmit identification information for identifying the generated memory box and the authentication information set by said setting unit to the client apparatus;
    a search unit, adapted to search, in response to reception of another print request from the client apparatus, the printing apparatus for a memory box for the client apparatus that issued the other print request; and
    a synthesized data transmission unit, adapted to transmit the synthesized data to the generated memory box in the printing apparatus,
    wherein, if said search unit finds the memory box, said command transmission unit does not transmit the command in response to reception of the other print request and said synthesized data transmission unit transmits the synthesized data to the memory box found by said search unit, and if said search unit does not find the memory box, said command transmission unit transmits the command in response to reception of the other print request, and
    wherein the memory box is a memory area in which a plurality of job information can be registered, and the job information registered in the memory area is extracted and printed in response to an instruction different from the print request.

8. A method carried out in a server apparatus, comprising:
a command transmission step of transmitting a command to a printing apparatus in response to reception of a print request from a client apparatus, the command being provided to generate a memory box for storing synthesized data created by synthesizing slip form data with variable data, wherein said command transmission step transmits the command before the synthesized data is transmitted to the printing apparatus;
a setting step of setting authentication information for the memory box generated based on the command transmitted in said command transmission step;
an information transmission step of transmitting identification information for identifying the generated memory box and the authentication information set in said setting step to the client apparatus;
a searching step of searching, in response to reception of another print request from the client apparatus, the printing apparatus for a memory box for the client apparatus that issued the other print request; and
a synthesized data transmission step of transmitting the synthesized data to the generated memory box in the printing apparatus,
wherein, if in said searching step the memory box is found, said command transmission step does not transmit the command in response to reception of the other print request and said synthesized data transmission step transmits the synthesized data to the memory box found in said searching step, and if said searching step does not find the memory box, said command transmission step transmits the command in response to reception of the other print request, server apparatus causes the printing apparatus to store the synthesized data in the found memory box, and
wherein the memory box is a memory area in which a plurality of job information can be registered, and the job information registered in the memory area is extracted and printed in response to an instruction different from the print request.

9. A computer-readable storage medium that stores a computer program for causing a computer to execute information processing carried out in a server apparatus, the information processing comprising:
a command transmission step of transmitting a command to a printing apparatus in response to reception of a print request from a client apparatus, the command being provided to generate a memory box for storing synthesized data created by synthesizing slip form data with variable data, wherein said command transmission step transmits the command before the synthesized data is transmitted to the printing apparatus;
a setting step of setting authentication information for the memory box generated based on the command transmitted in said command transmission step;
an information transmission step of transmitting identification information for identifying the generated memory box and the authentication information set in said setting step to the client apparatus;
a searching step of searching, in response to reception of another print request from the client apparatus, the printing apparatus for a memory box for the client apparatus that issued the other print request; and
a synthesized data transmission step, adapted to transmit the synthesized data to the generated memory box in the printing apparatus,
wherein, if the memory box is found in said command transmission step does not transmit the command in response to reception of the other print request and said synthesized data transmission step transmits the synthesized data to the memory box found in said searching step, and if said searching step does not find the memory box, said command transmission step transmits the command in response to reception of the other print request, and
wherein the memory box is a memory area in which a plurality of job information can be registered, and the job information registered in the memory area is extracted and printed in response to an instruction different from the print request.

10. A method carried out in a slip print system comprising a server apparatus, a client apparatus and a printing apparatus, said method comprising:
a command transmission step, executed in the server apparatus, of transmitting a command to the printing apparatus in response to reception of a print request from the client apparatus, the command being provided to generate a memory box for storing synthesized data created by synthesizing slip form data with variable data, wherein said command transmission step transmits the command before the synthesized data is transmitted to the printing apparatus;
a setting step, executed in the server apparatus, of setting authentication information for the memory box generated based on the command transmitted in said command transmission step;
an information transmission step, executed in the server apparatus, of transmitting identification information for identifying the generated memory box and the authentication information set in said setting step to the client apparatus;
a searching step, executed in the server apparatus, of searching, in response to reception of another print request from the client apparatus, the printing apparatus for a memory box for the client apparatus that issued the other print request; and
a synthesized data transmission step, executed in the server apparatus, of transmitting the synthesized data to the generated memory box in the printing apparatus,
wherein, if said searching step finds the memory box, said command transmission step does not transmit the command in response to reception of the other print request and said synthesized data transmission step transmits the synthesized data to the memory box found in said searching step, and if said searching step does not find the memory box, said command transmission step transmits the command in response to reception of the other print request;
a storing step, executed in the printing apparatus, of storing the synthesized data transmitted in said synthesized data transmission step in the generated memory box, wherein, if said searching step finds the memory box, said storing step stores the synthesized data in the found memory box; and
a printing step, executed in the printing apparatus, of obtaining the synthesized data from the memory box and print the obtained synthesized data, if input authentication information is authenticated based on the authentication information set in said setting step for the memory box,
wherein the memory box is a memory area in which a plurality of job information can be registered, and the job information registered in the memory area is extracted and printed in response to an instruction different from the print request.

11. A method according to claim 10, further comprising a deletion step, executed in the printing apparatus, of deleting the synthesized data from the memory box if the synthesized data has been printed in said printing step.

12. A method according to claim 10, further comprising a management step, executed in the server apparatus, of monitoring the synthesized data stored in the memory box and manage a time during which the synthesized data is stored in the memory box.

13. A method according to claim 12, wherein a charging process is executed according to the time during which the synthesized data is stored in the memory box.

14. A method according to claim 10, further comprising a notification step, executed in the server apparatus, of notifying the client apparatus of a status of the print request in response to a request from the client apparatus.

15. A method according to claim 10,
wherein the system further comprises a second printing apparatus,
wherein said command transmission step transmits the command to the second printing apparatus, if the memory box cannot be assured in the printing apparatus designated by the client apparatus, and
wherein the second printing apparatus stores the synthesized data in a memory box generated based on the command transmitted in said command transmission step, and obtains the synthesized data from the memory box and prints the synthesized data, if input authentication information is authenticated based on the authentication information set in said setting step for the memory box.

* * * * *